INVENTOR
W. F. H. BORMAN

BY Allard A. Braddock
ATTORNEY

United States Patent Office 3,335,075
Patented Aug. 8, 1967

3,335,075
ELECTROLYTIC POLYMERIZATION
OF PHENOL
Willem F. H. Borman, Dalton, Mass., assignor to General
Electric Company, a corporation of New York
Filed Aug. 10, 1964, Ser. No. 388,375
12 Claims. (Cl. 204—59)

ABSTRACT OF THE DISCLOSURE

A process for the preparation of polyphenylene ethers comprising the electrolytic polymerization of a phenol dissolved in a solution containing a copper salt-amine complex catalyst and a conductivity increasing agent in addition to the phenol. The solution may be mixed with an immiscible liquid such as water to form an emulsion and thereby decrease cost.

---

This invention relates to a method for forming polyphenylene ether resins. More particularly, it relates to a method for forming such resins by an electrolytic oxidation.

Previously methods have been shown for polymerizing substituted and unsubstituted phenols by a chemical oxidation to form polyphenylene ether resins. Such methods are disclosed, for example, in U.S. patents of Allan S. Hay, Patent Numbers 3,306,874, issued February 28, 1967, which shows the use of copper-primary and secondary amine catalysts; and 3,306,875, issued February 28, 1967, which shows the use of a copper-tertiary amine catalyst; both patents being assigned to the same assignee as the present invention. Each of these employs oxygen gas which is continuously added to the solution. Because the present process avoids the problem of the introduction of gaseous oxygen, it provides a method which is generally safer and easier to operate than the previously disclosed methods of polymerization.

Additionally, a method of coating using substituted and unsubstituted phenols in an electrolytic process has been shown by McKinney et al., in U.S. Patent 2,961,384. The method disclosed in that patent has certain limitations as to the substituted phenols which may be used, and generally those substituted in the 2 and 6 positions are not used. Further, the process contains neither the copper catalyst nor the amine complexing agent utilized in the present invention. The product produced by the electrolytic process of McKinney does not meet the elemental analysis of a polyphenylene ether resin and the structure contains metallic ions associated with the final product, the metal coming from the substrate on which the resin is deposited. On the other hand, the product produced by the process of the present invention is essentially free from chemically-bound metals and forms a free thermoplastic resinous material which is essentially linear and bonded through phenolic ether oxygen atoms.

It is one object of this invention to provide a safe, facile method of forming polyphenylene ether resins.

It is a further object of this invention to provide a free thermoplastic polyphenylene ether resin using an electrolytic oxidation process.

It is a still further object of this invention to provide a method for forming polyphenylene ether resins by an electrolytic oxidation in the presence of a catalyst and a complexing agent.

The present invention involves the electrolysis of a solvent solution of a phenol monomer, either substituted or unsubstituted. In addition to the monomer, the solution contains a catalyst which is a member selected from the group consisting of copper salts, and a complexing agent selected from the group consisting of amines and ammonia. The solution must also contain a conductivity-increasing agent and may contain a depolarizer. The electrolysis may be carried out either in an emulsion system, where the solvent is water, or in organic solvent solution. In either case, it is preferable that both water and a solvent be present in the overall system. The form of the apparatus in which the process is conducted may vary within wide limits.

The phenol monomers to which the present process may be applied are described in the aforementioned Hay applications and in my copending application Serial Number 374,139, filed June 10, 1964, assigned to the same assignee as the present invention. In general, they include compounds having the formula

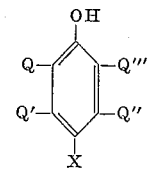

(1)

where X is a substituent selected from the group consisting of hydrogen, chlorine, bromine, and iodine; Q is a monovalent substituent selected from the group consisting of hydrogen, halogen, hydrocarbon radicals free of a tertiary alpha-carbon atom, and halohydrocarbon radicals having at least two carbon atoms between the halogen atom and phenol nucleus and being free of a tertiary alpha-carbon atom; Q' and Q'' are the same as Q, and, in addition, hydrocarbonoxy radicals free of a tertiary alpha-carbon atom, and halohydrocarbonoxy radicals having at least two carbon atoms between the halogen atom and phenol nucleus and being free of a tertiary alpha-carbon atom; and Q''' is the same as Q' and Q'' and, additionally, a radical selected from the group consisting of

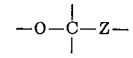

(2)

where

represents any single-ringed heterocyclic compound and Z is selected from the group consisting of O and S; and

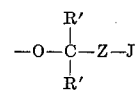

(3)

where Z is as defined above, J is selected from the group consisting of monovalent hydrocarbon substituents and substituted monovalent hydrocarbon substituents, and R' is the same as J and, in addition, hydrogen.

The term "free of a tertiary alpha-carbon atom" means that the terminal carbon atom of the aliphatic hydrocarbon substituent which is attached to the phenol nucleus (either directly if the substituent is hydrocarbon or halohydrocarbon or through the oxygen atom if the substituent is hydrocarbonoxy or halohydrocarbonoxy) has at least one hydrogen atom attached to it. It has been found that radicals with alpha-tertiary carbon atoms, e.g., tertiary butyl, tertiary amyl, etc., are so bulky that the presence of only one such group in the ortho position prevents the formation of polyarylene ethers. Additionally, if the substituents present in the Q and Q''' positions are both alkoxy or aryloxy, the formation of polyarylene ethers is prevented.

Preferably, the substituents designated Q', Q'', and X are hydrogen. Thus, the preferred monomer for use with the process of the present invention will have the formula

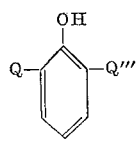

(4)

where Q and Q‴ are as previously defined.

Typical examples of the monovalent hydrocarbon radicals that Q, Q′, Q″, and Q‴ can represent are alkyl, including cycloalkyl, such as methyl, ethyl, propyl, isopropyl, butyl, secondary butyl, isobutyl, cyclobutyl, amyl, cyclopentyl, hexyl, cyclohexyl, methylcyclohexyl, ethylcyclohexyl, octyl, decyl, octodecyl, etc. The monovalent halohydrocarbon radicals may be the same as the hydrocarbon radicals, as described above, except methyl and alpha-haloalkyl radicals, where one or more of the hydrogen atoms are replaced by halogen to produce halohydrocarbon radicals having at least two carbon atoms between the halogen and the free valence, examples of which are: 2-chloroethyl, 2-bromoethyl, 2-fluoroethyl, 2,2-dichloroethyl, 2- and 3-bromopropyl, 2,2-difluoro-3-iodopropyl, 2-, 3-, and 4-bromobutyl, 2-, 3-, 4-, and 5-fluoroamyl, iodophenylethyl, phenylchloroethyl, bromotolylethyl, etc.

Additionally, Q′ and Q″ may represent monovalent hydrocarbon radicals such as aryl, including alkaryl, such as phenyl, tolyl, ethylphenyl, xylyl, naphthyl, methylnaphthyl, etc.; and halohydrocarbon radicals such as mono-, di-, tri-, tetra-, and penta-chlorophenyl, mono-, di-, tri-, and tetra-bromotolyl, chloroethylphenyl, ethylchlorophenyl, fluoro-xylyl, chloro-naphthyl, bromobenzyl, etc. Typical examples of the monovalent type of hydrocarbonoxy radicals are: methoxy, ethoxy, propoxy, isopropoxy, butoxy, secondary butoxy, hexoxy, octoxy, decoxy, butenoxy, phenyloxy, toloxy, ethylphenoxy, naphthoxy, methylmethoxy, benzoxy, phenylethoxy, phenylpropoxy, toloxy, etc. The monovalent halohydrocarbonoxy radicals may be the same as the above oxyhydrocarbons, except methoxy and alpha-haloalkoxy, where one or more of the hydrogen atoms are replaced by halogen, i.e., fluorine, chlorine, bromine, or iodine, to produce the halohydrocarbonoxy radicals having at least two carbon atoms between the halogen and the free valence, a few typical examples of which are: 2-chloroethoxy, 2-bromoethoxy, 2-fluoroethoxy, 2,2-dichloroethoxy, 2-, and 3-bromopropoxy, 2,2-difluoro-3-chloropropoxy, 2-, 3-, and 4-iodobutoxy, 2-, 3-, 4-, and 5-fluoroamoxy, 2-chlorobenzoxy, mono-, di-, tri-, tetra-, and penta-chlorophenoxy, mono-, di-, tri-, and tetra-toloxy, fluoroethylphenoxy, methylchlorophenoxy, iodoxyloxy, chloronaphthoxy, bromobenzoxy, chlorophenylethoxy, phenylchloroethoxy, bromotoloxy, etc.

In addition to the possible substituents mentioned above for Q, Q′, and Q″, radicals having the formulas noted in (2) and (3) can be used for Q‴. Among the single-ringed heterocyclic compounds are those having oxygen atoms such as furan, pyran, dioxane, etc.; rings containing sulfur atoms such as thiophene, etc.; and those containing more than one member of the group defined above as Z, such as oxathiole. The only requirement is that at least one of the heterocyclic oxygen or sulfur atoms be adjacent to the carbon atom which is bonded to the ether linkage to the phenol group. Included among the non-cyclic compounds which are described in Formula 3 are methylal [—CH(OCH₃)₂], ethylal [—CH(OCH₂H₅)₂] and other acetals and thioacetals meeting the formula

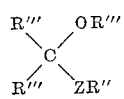

(5)

where Z is as defined above, R″ is a monovalent, aliphatic hydrocarbon radical having less than 12 carbon atoms, R‴ is selected from the group consisting of hydrogen, aliphatic and aromatic hydrocarbon radicals, and R⁗ is the group

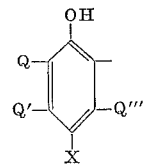

(6)

where X, Q, Q′, and Q″ are as defined above.

Following polymerization, any of the monomers form a resin having the formula

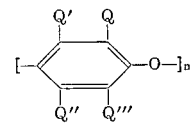

(7)

where Q, Q′, Q″, and Q‴ are as previously defined, and n is an integral number and is at least 10 and can be as high as 1500.

Any of the monomers described may be utilized in either the emulsion or the solvent polymerization process. Because there is some difference in the method of operation and in the particular materials included in the anolyte solutions which contain the monomer, depending upon whether it is an emulsion or a solvent polymerization, the two processes now will be described individually.

*Emulsion polymerization*

The emulsion polymerization is conducted in a water solution. Such a polymerization is, therefore, less expensive than the solvent polymerization and, additionally, is safer due to the lower concentration of the flammable solvent. Further, ammonia, which may be used as a catalyst in the emulsion polymerization, is much less expensive than the amines which are utilized in the solvent polymerization.

As a first component, the anolyte must contain at least one of the monomers described by Formulas 1–5. The amount of monomer which can be present in the emulsion should be less than about 50%. Any concentration up to this amount may be used; a preferable amount is from 20 to 30%.

The second component necessary in the emulsion polymerization anolyte is a copper catalyst, which as previously noted, is supplied by a copper salt. The particular copper salt to be used as the catalyst may be selected from a large group. It may be either a cupric or a cuprous salt, the only limitation being that, if a cuprous salt is used, it must be capable of existing in a cupric state and must form a complex with the amine or ammonia which is a third necessary part of the anolyte solution. Typical examples of copper salts which can be used are cuprous chloride, cupric chloride, cuprous bromide, cupric bromide, cuprous sulfate, cupric sulfate, cuprous azide, cupric azide, cuprous tetraamine sulfate, cupric tetraamine sulfate, cuprous acetate, cupric acetate, cuprous propionate, cupric butyrate, cuprous palmitate, cupric laurate, cuprous benzoate, cupric toluate, etc. The highest molecular weight polymers are produced when using cuprous chloride, cupric chloride, cuprous bromide, cupric bromide, cuprous azide, and cupric azide. The ratio of monomer to copper salt should be in the range of from 400:1 to 1:1. The preferable range of monomer to copper salt is from 50:1 to 10:1. The more copper catalyst used, the higher is the molecular weight of the polymer produced.

The complexing agent used with the copper in the emulsion polymerization can be selected from the group consisting of ammonia and amines. The ammonia is preferable because the results obtained are essentially equivalent, and the price of the ammonia is significantly less. However, any of the secondary amines described in the aforementioned Hay Patent No. 3,306,874, and any of the tertiary amines described in the aforementioned Hay Patent No. 3,306,875 can be used in the emulsion polymerization according to the process of the present invention. The ratio of amine or ammonia to copper should be from 1:1 to 10:1 or even higher. The preferred range is from 2:1 to 5:1.

A further essential component of the anolyte solution is an ionic conductor. The major purpose of the conductor is to provide a liquid of sufficient conductivity that ohmic losses and heat generation are minimized. The ionic conductor may be any inert salt, generally an alkali or alkaline earth metal salt of the anion of a strong acid. Additionally, alkali or alkaline earth acetates can be used. Among these salts are sodium chloride, potassium nitrate, barium nitrate, strontium chloride, and potassium sulfate. A particularly advantageous ionogen is an acetate salt, for example, sodium acetate or potassium acetate. The acetate radical has some advantages over the other mentioned groups in that it has a slight buffering effect on the pH. The amount of conducting salt which should be added to the emulsion is in the range of from a trace to an approximately 2 normal solution. Thus, for sodium chloride this range is from about 0 to 10% by weight of the emulsion, the preferred amount being from about 3 to 6%. It is possible to use a lower voltage when more conductors are added to the solution.

The pH of the emulsion should be adjusted to from 10.5 to 12 to improve its stability. Among the agents which may be used to adjust the pH are the alkali metal hydroxides and quaternary ammonium salts. The use of an acid will render the emulsion unstable and prohibit polymerization. When the quaternary ammonium salt is used to adjust the pH, it may also serve the function of acting as the emulsifying agent.

For best results, a depolarizer should also be added to the solution. A depolarizer, generally, is a compound which is reversibly oxidizable and reducible; the oxidized form of the depolarizer oxidizes the monomer to the polymer and enables the cell to operate at a lower potential. The depolarizer aids in reducing the overvoltage of the electrolytic cell. When the overvoltage is too high, the monomer is not polymerized, but rather is destructively oxidized to low-molecular-weight oxidation products. Depolarizers aid in lowering the overvoltage at the anode of the cell because they are oxidized at a given anode overvoltage lower than the destructive-oxidation voltage of the monomer. Among the materials which may be used in the emulsing polymerization to limit the overvoltage at the anode are metal salts having anions selected from the group consisting of $MnO_4^=$, $[Fe(CN)_6]^=$, $Cl^-$, and $Br^-$, or salts having cations such as $Mn^{+++}$, $Cr^{+++}$, and $Ce^{+++}$. Additionally, non-reversibly oxidizable organic materials such as methanol, acetone, and acetic acid may be used as the depolarizer. The amount of depolarizer which should be added is in the range of from 0 to 5%, preferably about 1% of the overall emulsion.

To aid in maintaining a more stable emulsion, an organic emulsifier should also be added. The emulsifier should be selected from the group consisting of anionic and nonionic emulsifiers; cationic emulsifiers are not active at the high pH used in the emulsion polymerization. Among the anionic emulsifiers are the alkali and amine soaps. A wide variety of nonionic emulsifiers exist for use in this process. Among these are the addition products of ethylene oxides and polypropylene glycols, alkylphenoxy polyoxyethylene ethanols, polyoxyethylene derivatives of fat-forming fatty acids, fatty acid partial esters of hexitol anhydrides, alkylphenyl ethers of polyethylene glycol, and polyalkalene glycol ethers. The amount of emulsifier which should be used is in the range of from 0.1 to 5%, preferably from 0.5 to 1.5.

When using the emulsion polymerization method, a small amount of an organic solvent is still necessary. The purpose of this solvent is to keep the polyphenylene oxide resin in solution after formation. The solvent should be nonmiscible with water, while still a solvent for the resin, and can include the aromatic hydrocarbons and chlorinated hydrocarbons, both paraffinic and aromatic. The amount of solvent which should be used is from 1 to 5 times the quantity of the monomer in the solution, by weight.

Solvent solution polymerization

When using a solvent solution for the electrolytic polymerization, the amount of monomer which can be used is less than that with the emulsion electrolytic polymerization. The maximum amount is approximately 20% of the monomer previously described by the Formulas 1–5. The solvents which can be used as the solution carrier are those which act as a solvent for both the monomer and the polymer and can be selected from the group consisting of pyridine, aromatic hydrocarbons, and chlorinated hydrocarbons, both paraffinic and aromatic. Particular examples of these solvents are benzene, toluene, xylene, chlorobenzene, bromotoluene, chlorohexane, and bromopentane.

To promote the polymerization, as in the case of the emulsion electrolytic polymerization, both a copper source and an amine salt must be utilized. The copper can again be derived from a copper salt placed in the solution. The copper salts which can be used are the same as those described for the emulsion polymerization. The ratio of monomer to copper salt used should be in the range of from 400:1 to 1:1, preferably from 50:1 to 10:1. Again, the more copper salt that is used, the higher is the molecular weight of the polyphenylene oxide resin produced.

Due to the organic nature of the solution, ammonia is not preferred as a complexing agent in the solvent polymerization. However, a wide variety of secondary and tertiary amines, such as described in the aforementioned Hay applications may be utilized. The ratio of amine to copper salt should be in the range of 1:1 or higher, preferably from 2:1 to 50:1.

A conductor must be present in the solution to allow the polymerization to proceed. The conductor may be supplied by an organic salt, such as amine salts, quaternary ammonium salts, and quaternary phosphonium salts. Specific amine salts which may be used are amine hydrochlorides. Additionally, a polar solvent may be added to increase the conductivity of the solution. These solvents include such materials as dimethylformamide, diethylformamide, methanol, organic sulfones, tetrahydrofuran, and diethylacetamide. The amount of such a solvent should be enough to form a 0 to 1 normal solution of the organic electrolyte in the solvent, preferably about a 0.5 normal solution. Another method of providing such a conductor is to add a quantity of an acid, such as hydrochloric acid. When pyridine is the solvent, pyridine hydrochloride is formed and methanol must be also added to enhance the solubility of the pyridine hydrochloride in the pyridine. As a depolarizer is preferably used in the organic solution, as well as in the emulsion system, the methanol serves the double purpose of increasing the pyridine hydrochloride solubility and acting as a depolarizer during the operation of the cell.

When methanol is not present, or when pyridine which is also a depolarizer is not used as the solvent, other organic depolarizers may be used. These include alcohols generally and acetone. These materials should be present in an amount of from about 0 to 5%, by weight, of the solution, preferably about 1%.

In the solvent electrolytic polymerization it also is preferable to employ a quantity of water to increase the conductivity of the solution. The amount of water which can be used is immaterial, so long as the overall solution remains homogeneous.

Examples of specific apparatus for carrying out this invention are shown in the drawings in which.

The apparatus shown will now be described in greater detail.

Figure 1:
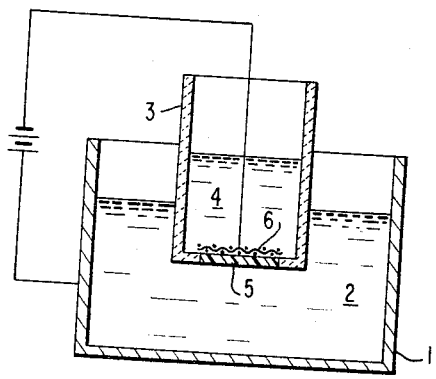
FIGURE 1 is a diagrammatic representation of one form of cell for carrying out the invention as a batch process.

In FIG. 1 a conducting metal, such as platinum, forms the anolyte container 1 in which the anolyte emulsion or solution 2 is contained. Within the anolyte 2 and inert, non-conducting container 3 for the catholyte 4 is placed. The catholyte container 3 is spaced from the walls and the bottom of the anolyte container 1. The bottom of the catholyte container which is spaced from the anolyte container is faced with an ion exchange membrane 5 which is within the body of the anolyte. Within the catholyte and spaced from the ion exchange membrane is a cathode 6 in the form of a screen or mesh. The cathode is connected through an external power source to the anolyte container 1 which also acts as the anode.

Figure 2:
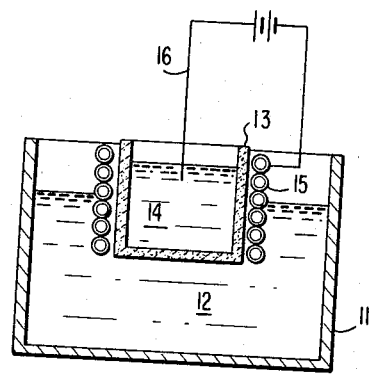
FIGURE 2 is a diagrammatic representation of a cell for carrying out the process of the present invention as a batch process where one of the electrodes serves more than one function.

In FIG. 2 a catholyte container 11 is formed of a non-conducting material. The catholyte 12 is within this container. A porous nonconducting cup 13 formed of a material such as unglazed porcelain is placed within the catholyte in spaced relation from the walls and bottom of the catholyte container. The cup contains the anolyte solution 14. A coil of copper tubing 15 is wrapped around the anolyte cup, a portion of the tubing being within the catholyte solution. A liquid, such as water, circulating through the copper tubing acts to cool the solutions and the copper tubing additionally acts as the cathode of the cell, being connected through an external power source to the anode 16 which is within the anolyte solution. The anode preferably consists of a mesh or screen closely spaced along the inside of the porous cup 13.

Figure 3:
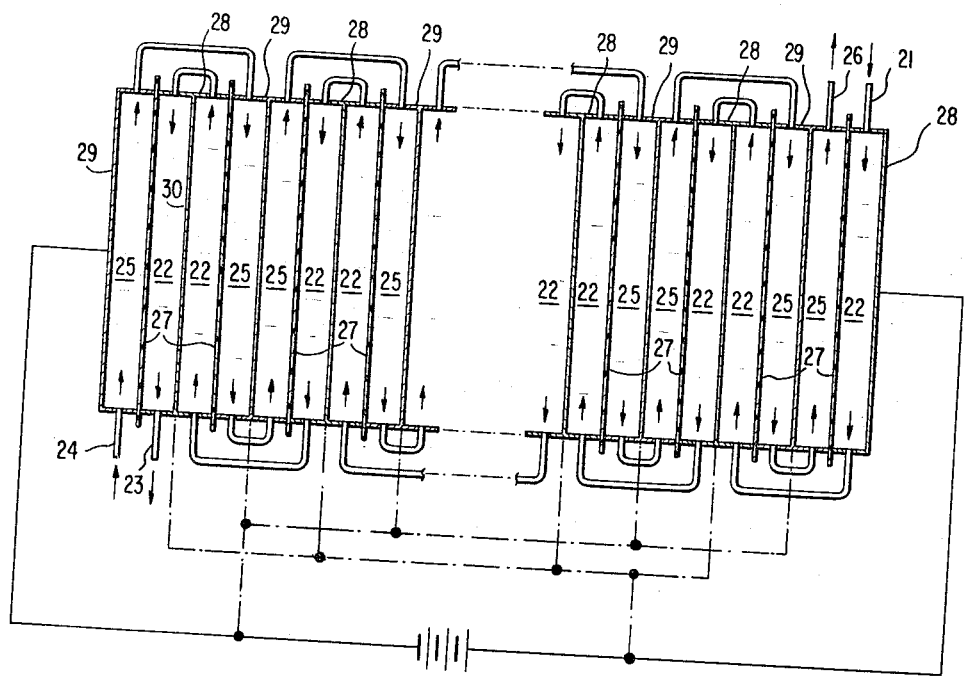
FIGURE 3 shows one form of apparatus for carrying out the polymerization of the present invention continuously.

One form of apparatus which can be used for continuous polymerization of the phenolic monomer is shown in FIG. 3. In this apparatus the monomer solution or emulsion enters at 21, passes through a series of cells 22 and exits from the cells as polymer solution at 23. The catholyte solution enters the apparatus at 24, passes through a series of cells 25 and exits at 26. Between the catholyte cells 25 and the anolyte cells 22 are porous diaphragms or ion exchange membranes 27, particularly anion exchange membranes which allow passage of anions from the catholyte cells to the anolyte cells but prevent diffusion of Cu++ ions to the catholyte cells. Anodes 28 are placed between each two anolyte cells and at one end adjacent an anolyte cell and cathode 29 are placed between each two adjacent catholyte cells and at the opposite end of the assembly adjacent a catholyte cell. The anodes and cathodes are connected through an external power source to drive the reaction. The dividers 30 between adjacent anolyte cells and between adjacent catholyte cells are nonporous and conducting. The series of cells may be connected, as shown, or may be separated.

As was noted in the description of the apparatus, the catholyte is placed in a compartment adjacent the anolyte, separated only by an ion exchange membrane or a semiporous material. In the electrolytic polymerization process of the present invention, the catholyte acts essentially as a reference electrode. Its composition may be roughly that of the anolyte, excluding the copper, amine or ammonia, and monomer. Because it is separated from the anolyte only by a membrane or a semiporous material, it must be isotonic with respect to the anolyte; that is there must be no osmotic pressure built up from either side of the membrane or semiporous material. The catholyte should have as high an electrolyte concentration as possible, except as limited by the isotonic requirement. Preferably, the catholyte should also contain a quantity of sodium hydroxide to neutralize the acid generated by the polymerization reaction in the anolyte. The hydroxyl ions of the sodium hydroxide will then migrate through the ion exchange membrane or the semiporous material and neutralize the hydrogen ions in the anolyte. Any of the solvents described with respect to the anolytes may be used in the catholyte, but preferably the same solvent should be used in both the anolyte and the catholyte. That is, in an emulsion polymerization the major constituent of the catholyte should be water, while in the solvent polymerization the catholyte preferably should be formed of the same solvent as used in the anolyte.

A wide variety of materials may be utilized for the anode. Generally, the anode consists of a conducting material which is virtually inert under operating conditions. Among the materials which can be used are graphite, platinum, iron, nickel, lead, and others, including alloys of the above-mentioned materials. The anode may be formed in any of a number of shapes including sheets, screens, rods, wires, tubing, etc., but preferably should have as large a surface area as possible consistent with the overall dimensions of the electrolytic cell. The anode may be treated for surface modification. For example, platinum may be platinized, lead may be covered with lead oxide, and these and the other materials may be subjected to other treatments which are commonly employed in electrolytic oxidations. The preferred anode material is iron as iron anodes tend to create the lowest overvoltage of any of the mentioned materials. When the electrodes are in the form of tubes, for example, they may additionally carry cooling fluid to regulate the reaction temperature. Generally, the materials and shapes of the electrodes described for the anode, are equally applicable to the cathode, but a considerably wider range in the choice of materials is possible because of the lowered tendency of cathodic metals to dissolve in the reaction medium.

One method of forming an electrode having great surface areas, which might be used in the apparatus employed is the present invention, is to rivulet or dimple an electrode sheet. The two electrodes should be spaced as closely as possible to minimize power requirements. However, the space between the electrodes should be sufficient to allow circulation of the various electrolytic materials. To close a spacing may prevent circulation of the anolyte and cause desposition of the polymerized material on the anode.

The ion exchange membranes, designated as 5 in FIG. 1 and as 27 in FIG. 3 should preferably be anion exchange membranes. Such membranes prevent copper from passing between the compartments, while allowing the passage of hydroxyl ions from the cathode to the anode so as to neutralize any generated acid. The membrane should be as thin as possible and have as high a conductivity as possible. Among the ion exchange membranes which may be used are materials such as the aminated polystyrenes sold under the name of "Amberlite," the alkylene cross-linked polyalkylene amines marketed under the name "Duolite," the ammoniated styrene divinylbenzene copolymers sold under the name "Dowex," and others. In place of an ion exchange membrane a semiporous material, such as an unfired porcelain, may be utilized. While this does not provide all the advantages of an ion exchange membrane, it does give a separation between the two electrolyte solutions, while allowing transfer of only a portion of the materials.

The electrical requirements of the cell generally vary with the type of anolyte used. In the aqueous emulsion polymerization the voltage requirement is usually less than about 16 volts, while when employing a solvent medium about 100 volts are required. The voltage, of course, varies with the conductivity of the solution and the geometry of the cell. Two faradays are necessary for the polymerization of one mole of any of the phenols. This is equivalent to 53.6 ampere-hours per mole of phenol. The efficiency of the operation varies from about 45% up to 85%. The current density on the electrodes, for best results, should range from about 0.001 amp./cm.$^2$ to 0.5 amp./cm.$^2$. Above this range the heat generation is too great for efficient operation of the process. The time of reaction will depend upon the current density at the electrodes, the efficiency of the cell, and the amount of monomer to be polymerized.

The formation of diphenoquinones is a competing reaction with the polymerization. To avoid this byproduct, the temperature should generally be kept below about 40° C. Further, the generation of diphenoquinones may be prevented by keeping the overvoltage as low as possible. For example, the overvoltage is lessened with iron electrodes and with the use of depolarizes while a smooth platinum electrode will give a high overvoltage. With the exception of the dihalophenols the temperature should be kept below 40° C. When using dihalophenols the temperatures should range from about 60 to 90° C. for effective polymerization.

To aid in maintaining the various required temperatures, one or both of the electrodes may be formed of a coil through which a cooling medium is passed, or the entire electrolysis assembly may be placed in a bath containing a temperature-maintaining medium. The order of addition of the various materials to the apparatus is immaterial.

The method of recovering the polymer depends upon whether the emulsion polymerization or the solvent polymerization is used. With the emulsion process, the emulsion is broken by addition of an acid, releasing the polymer. The polymer is then recovered by filtration.

In the solvent polymerization, the final polymer solution is poured into a non-solvent for the polyphenylene ether resin. Among these non-solvents are methanol and acetone. More generally, this material is poured into an acidified non-solvent. Additionally, following filtration from the non-solvent, the polymer may be redissolved, as in toluene, and then reprecipitated and refiltered.

The following are examples of the polymerization utilizing the electrolytic process and should not be considered as limiting in any way the full scope of this invention as covered by the appended claims.

EXAMPLE 1

Solution polymerization

A porous ceramic cup, 90 mm. deep, 43 mm. inside diameter, and having a wall thickness of 4 mm., was fitted with a spiral copper tubing outside of the cup. The copper tubing acted as the cathode and additionally as a cooling coil, cold tap water being passed through it. The cup and coil were placed inside a 60 ml. "Pyrex" beaker which was placed on a "Mag Mix" magnetic stirrer apparatus. A stainless steel screen was fitted along the inside wall of the porous cup to act as the anode. A magnetic stirring bar coated with polytetrafluoroethylene and forming part of the Mag Mix apparatus was placed inside the cup to provide stirring action.

An electrolyte medium was prepared by mixing 350 ml. pyridine, 175 ml. methanol, 43.8 g. N,N,N',N'-tetramethyl-1,3-butanediamine, and 17.5 ml. 38% aqueous hydrochloric acid. A portion of the solution was placed in the Pyrex beaker up to a level of 1.5 cm. below the rim of the porcelain cup in order to saturate the porcelain with conducting solution. In 70 ml. of the electrolyte medium 2 g. of 2,6-dimethylphenol and 0.1 g. cuprous chloride were dissolved. This solution was placed inside the porous cup as the anolyte.

The cathode and anode were connected to a direct current power source via a rheostat and an ammeter was placed in the line. The current was kept constant at one amp. for 120 minutes; a voltage of 36–50 volts across the cell was required. During the reaction, the temperature was maintained between 25 and 35° C.

After 120 minutes, the anolyte solution was added to 150 ml. methanol and acidified with aqueous hydrochloric acid. A voluminous precipitate formed. The precipitate was filtered, washed with methanol, and dried to give a yield of 0.5 g. of a light yellow material. This yellow material was analyzed by infrared spectrophotometry and showed a spectrum identical to that of poly-(2,6-dimethylphenylene oxide) prepared by the method described in the aforementioned applications of Hay et al. By infrared spectrophotometry, the phenolic hydroxyl content was shown to be about 1% which indicated that the resin had an average molecular weight of about 1700, corresponding to $n$ in Formula 7 of about 14.

EXAMPLE 2

Emulsion polymerization

The same apparatus as that described in Example 1 was utilized. The catholyte, placed in the Pyrex beaker, consisted of 1.6% solution of aqueous sodium hydroxide. A solvent solution was prepared containing 2 g. of 2,6-dimethylphenol and 0.2 g. of oleic acid in 4 ml. of benzene. The solvent solution was emulsified in 60 ml. of water containing 0.6 g. sodium chloride, 0.6 g. potassium ferricyanide [$K_3Fe(CN)_6$] as a depolarizer, and 0.1 g. of triethanolamine. A catalyst consisting of 1.5 g. of copper sulfate [$CuSO_4.5H_2O$] dissolved in 3 ml. of water and 12.5 ml. of 30% aqueous ammonia was added to the previously described emulsion. The resulting emulsion, with a pH of 11.3, was placed inside the porous cup as the anolyte. An ultrasonic probe was inserted in the porous cup to maintain the emulsion in a finely dispersed state.

A current of one amp. was maintained for 85 minutes employing a potential of from 4–7 volts. The temperature during the generation of current was maintained at 25–35° C. Following application of the current, the emulsion was added to 250 ml. of methanol and was subsequently acidified with a small quantity of aqueous hydrochloric acid. The precipitate which formed was filtered off, washed with methanol, and redissolved in 25 ml. of chloroform. This solution was added to 150 ml. of methanol and the precipitate which formed filtered off, washed with a 2% aqueous solution of sodium hydroxide to remove the ferricyanide, washed again with methanol, and dried. The yield was 0.7 g. of polyphenylene oxide resin, as indicated by infrared analysis, and had an intrinsic viscosity in chloroform at 30° C. of 17 ml./g.

EXAMPLE 3

Effect of omission of depolarizer

The conditions of Example 2 were duplicated except that the potassium ferricyanide which had been used as a depolarizer was omitted. Instead, 1.2 g. of sodium chloride was used. At the end of the reaction, the emulsion was added to 150 ml. of methanol, acidified with aqueous hydrochloric acid, and the resulting precipitate filtered, washed with methanol, and dried. No further purification was required. The yield in this example was only 0.44 g. as compared to the 0.7 g. after reprecipitation in Example 2. The intrinsic viscosity, indicative of the molecular weight of the product, was also much lower than in Example 2, being 7 ml./g. in chloroform at 30° C.

EXAMPLE 4

Use of semipermeable separator

A shallow platinum dish having a depth of 2 cm., and a diameter of 8 cm., was used as both the anode and as the anolyte container. The catholyte container consisted of a 5 cm. glass jar with the bottom removed. A 4 cm. hole was cut in the lid of the jar and an anion exchange membrane formed from polyethylene impregnated chloromethylated polystyrene which is subsequently reacted with trimethylamine, was clamped between the lid and the rim of the jar using rubber gaskets to provide a tight seal.

The platinum dish was placed in a 600 ml. Pyrex beaker which contained a layer of water 1 cm. deep. The beaker was externally cooled in a water bath. An emulsion containing 1 g. of 2,6-dimethylphenol, 2 ml. of benzene, 0.1 g. of oleic acid, 0.05 g. of triethanolamine, 0.1 g. of cupric sulfate [$CuSO_4 \cdot 5H_2O$], 2 ml. of a 30% aqueous solution of ammonia, and 0.05 of N,N,N'N'-tetramethyl-1,3-butanediamine in 50 ml. of water was placed in the platinum dish. The pH of the emulsion was adjusted to 10.95 by the addition of a 10% aqueous solution of sodium hydroxide.

Agitation in the platinum dish was provided by a magnetic stirring bar coated with polytetrafluoroethylene and a magnetic stirrer apparatus placed under the water bath. The previously described cathode compartment was placed just inside the emulsion so that the membrane was below the surface of the anolyte but distant enough from the bottom of the platinum dish to allow a freedom of motion to the magnetic stirring bar. A cathode was provided by placing a perforated copper disc having a diameter of 4 cm. on top of the membrane and covering this was a catholyte solution consisting of a 10% aqueous solution of sodium hydroxide.

The anode and cathode were connected to a direct current power supply via a rheostat and an ammeter was placed in the line. A one amp. current was passed through the cell for one hour at a voltage of from 25–35 volts. The apparatus was then disassembled and the anolyte added to 100 ml. of methanol and subsequently acidified. The precipitate of polyphenylene ether resin formed was filtered off and dried.

A small amount of solid material was found to have settled out on the bottom of the platinum dish, this deposit being attributed to a partial coagulation of the emulsion during the reaction. The deposit was washed with methanol, dissolved in 20 ml. of chloroform, the solution filtered and added to 100 ml. of methanol which contained 0.5 ml. of 38% aqueous hydrochloric acid. The precipitate which formed was washed with methanol and dried. The purified deposit was combined with the polymeric product to give a total yield of 0.39 g., which, by infrared analysis, showed a polyphenylene ether resin structure.

EXAMPLE 5

*Solution polymerization*

The same apparatus as that described in Example 1 is utilized. An electrolyte medium is prepared by mixing 350 ml. benzene, 15 ml. acetone, 35 ml. dimethylformamide, 40 g. methylpropylamine, and 5 g. of methylpropylamine hydrochloride. A portion of this solution is placed in a Pyrex beaker up to a level of 1.5 cm. below the rim of the porcelain cup in order to saturate the porcelain with conducting solution. In 70 ml. of the electrolyte medium 2 g. of 3-methylcatechol-1-pyranol ether and 0.1 g. cuprous sulfate are dissolved. This solution is placed inside the porous cup as the anolyte.

The cathode and anode are connected to a direct current power source through a rheostat and an ammeter is placed in the line. The current is kept constant at 1 amp. for 120 minutes; a voltage drop of about 50 volts is required. During the reaction, the temperature is maintained between 25° and 35° C.

After 120 minutes, the anolyte solution is added to 150 ml. methanol and acidified with acetic acid. A precipitate is formed which is filtered, washed with additional methanol, and dried to give the final polymer having the formula

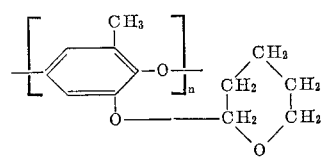

EXAMPLE 6

*Emulsion polymerization*

The same apparatus as that described in Example 1 is utilized. The catholyte, placed in the Pyrex beaker, consists of a 1.6% solution of aqueous sodium hydroxide. A solvent solution is prepared containing 2 g. of 2,6-dimethylphenol and 0.2 g. of an addition product of ethylene oxide and propylene glycol, such as that sold under the trademark "Pluronic" in 4 ml. of benzene. The solvent solution is emulsified in 60 ml. of water containing 0.6 g. of potassium chloride, and 0.6 g. potassium manganate [$K_2MnO_4$]. A catalyst consisting of 1.5 g. of cuprous acetate is dissolved in 3 ml. of water and 4 g. of dimethylamine was added to the previously described emulsion. A quantity of 10% aqueous sodium hydroxide is added to raise the pH of the emulsion to about 11. The emulsion is then placed inside the porous cup as the anolyte. An ultrasonic probe is inserted in the porous cup to maintain the emulsion in a finely dispersed state.

A current of 1 amp. is maintained for about 90 minutes with a potential of about 10 volts. The temperature during the current generation is maintained at about 30° C. Following application of the current, the emulsion is added to a quantity of methanol and then acidified with a small quantity of aqueous hydrochloric acid. The precipitate is filtered off, washed with methanol, and redissolved in chloroform. This solution is then added to additional methanol, the precipitate filtered off and washed again with methanol and dried. The product is a polyphenylene oxide resin having the formula

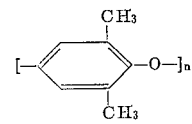

It is apparent from the disclosure and examples that a versatile method of forming polyphenylene ether resins by an electrolytic polymerization has been shown. The process may be applied to a wide variety of phenolic monomers over a wide range of operating conditions. By proper control of the reaction the yield may be essentially limited to polyphenylene ether resins, and the molecular weight may be controlled. Additionally, problems inherent in the use of gaseous oxygen are avoided and a more facile method of producing the polyphenylene ether resins is provided.

The examples were illustrative only of products which may be formed by the process of the present invention and should not be considered as limiting in any way the full scope of the invention as covered by the appended claims. The polyphenylene ether resins produced by the process just described may be subjected to any of the uses described for such resins in the aforementioned Hay et al. application and in my copending application, Serial No. 374,139, assigned to the same assignee as the present invention.

What I claim as new and desire to secure by Letters Patent of the United States:

1. A process for forming a polyphenylene ether resin having the formula

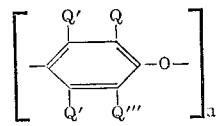

where $n$ is an integer of from 10–1500, Q is a monovalent substituent selected from the group consisting of hydrogen, halogen, hydrocarbon radicals free of a tertiary alpha-carbon atom, and halohydrocarbon radicals having at least two carbon atoms between the halogen atom and phenol nucleus and being free of a tertiary alpha-carbon atom; Q' and Q" are the same as Q and, in addition, hydrocarbonoxy radicals free of a tertiary alpha-carbon atom, and halohydrocarbonoxy radicals having at least two carbon atoms between the halogen atom and the phenol nucleus and being free of a tertiary alpha-carbon atom; and Q''' is the same as Q' and Q" and, in addition, a radical selected from the group consisting of

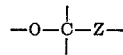

where

represents any single-ringed heterocyclic compound and Z is selected from the group consisting of O to S, and

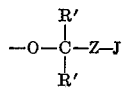

where Z is as defined above, J is selected from the group consisting of monovalent hydrocarbon substituents and substituted monovalent hydrocarbon substituents, and R' is the same as J and, in addition, hydrogen; forming a solvent solution comprising up to about 50% of a monomer having the formula

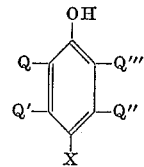

where Q, Q', Q", and Q''' are as defined above, and X is selected from the group consisting of hydrogen, chlorine, bromine, and iodine; a copper salt catalyst, a complexing agent selected from the group consisting of ammonia, secondary amines, and tertiary amines; and an ionic conductor; placing the solution in the anode compartment of an electrode cell and applying an electric current for a period of time sufficient to cause the monomer to polymerize.

2. The process of claim 1 wherein said solvent is water and said complexing agent is ammonia, and said solution additionally contains an emulsifier selected from the class consisting of anionic and nonionic emulsifiers and an organic solvent for said polyphenylene ether resin and said monomer.

3. The process of claim 2 wherein said monomer has the formula

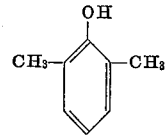

and said polymer has the formula

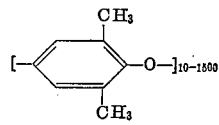

4. The process of claim 2 wherein said solution contains a depolarizer.

5. The process of claim 1 wherein said solvent is an organic solvent capable of dissolving both the monomer and the polymer and said complexing agent is a secondary amine.

6. The process of claim 5 wherein an ionic organic salt is added to increase the conductivity of the solution.

7. The process of claim 5 wherein a polar solvent is added to increase the conductivity of the solution.

8. The process of claim 5 wherein the solution additionally contains water.

9. The process of claim 1 wherein said solvent is an organic solvent capable of dissolving both the monomer and the polymer and said complexing agent is a tertiary amine.

10. The process of claim 9 wherein an ionic organic salt is added to increase the conductivity of the solution.

11. The process of claim 9 wherein a polar solvent is added to increase the conductivity of the solution.

12. The process of claim 9 wherein the solution additionally contains water.

References Cited

UNITED STATES PATENTS

| | | | |
|---|---|---|---|
| 2,760,926 | 8/1956 | Kronenthal | 204—59 |
| 2,961,384 | 11/1960 | McKinney | 204—14 |
| 3,140,276 | 7/1964 | Forster | 204—72 X |

HOWARD S. WILLIAMS, *Primary Examiner.*

JOHN H. MACK, *Examiner.*